April 21, 1964
C. C. MINTER
3,130,301
SIGNAL SUMMING INDICATOR
Filed Aug. 12, 1960
2 Sheets-Sheet 2
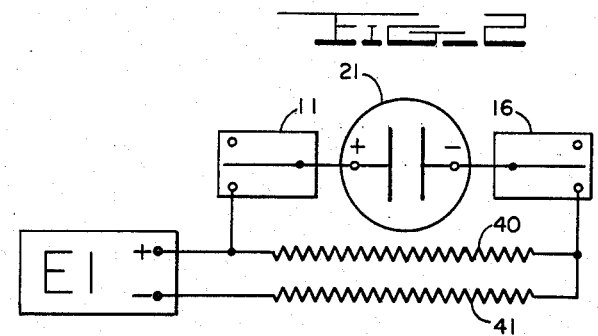
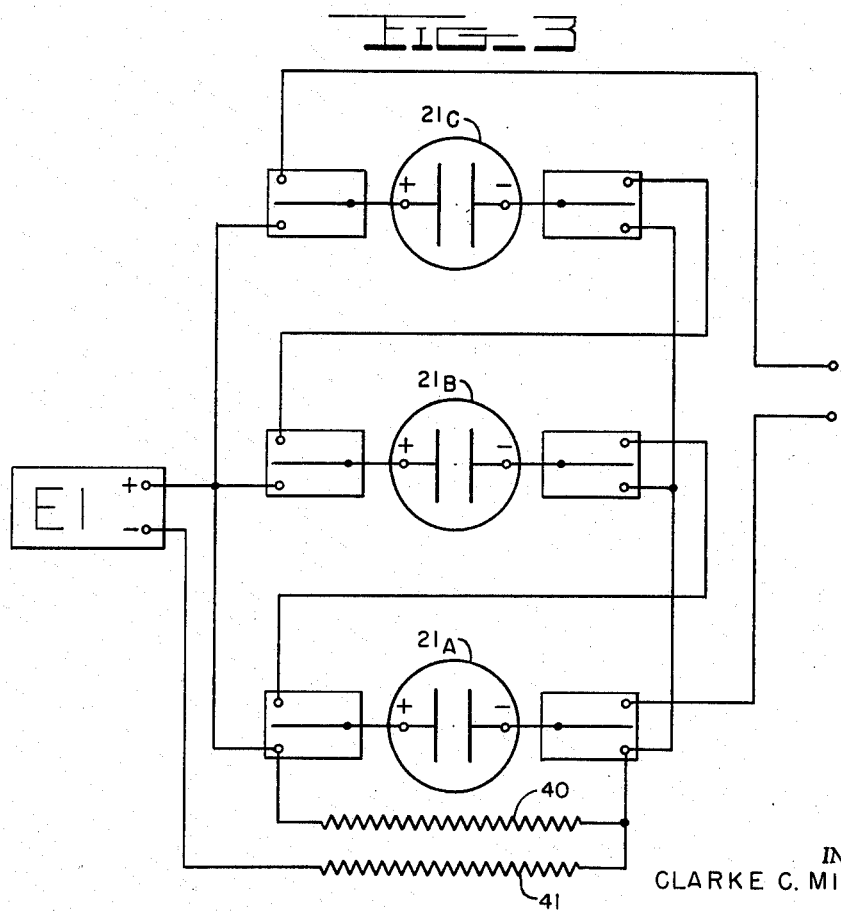
INVENTOR
CLARKE C. MINTER
BY *Richard C. Reed*
ATTORNEY

United States Patent Office 3,130,301
Patented Apr. 21, 1964

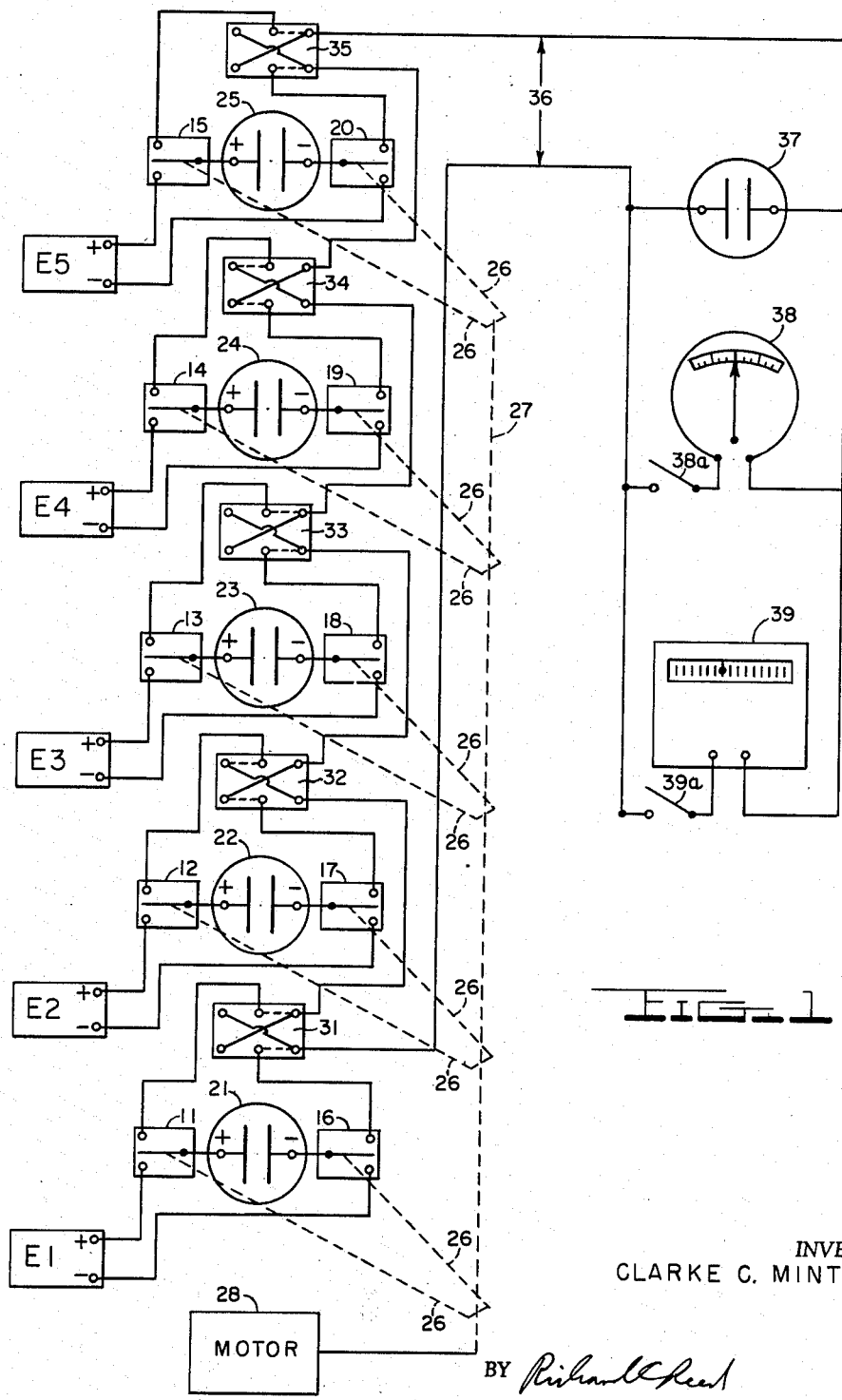

3,130,301
SIGNAL SUMMING INDICATOR
Clarke C. Minter, 3136 Dumbarton Ave. NW.,
Washington, D.C.
Filed Aug. 12, 1960, Ser. No. 49,394
1 Claim. (Cl. 235—193)
(Granted under Title 35, U.S. Code (1952), sec. 266)

The invention described herein may be manufactured and used by or for the Government of the United States of America for governmental purposes without the payment of any royalties thereon or therefor.

This invention relates generally to computing devices and more specifically to a means for obtaining the algebraic sum of several electrical signals.

This application is a continuation-in-part of my copending application for "Signal Summing Indicator," Serial No. 18,782, filed March 30, 1960, now abandoned.

In many situations where signals from several sources are desired either for information or for automatic control of some means in response to the signal information, simplification of the control function or of the use and understanding of the multisource information can be accomplished by providing a single output in response to the multiple signals. A single output is desired in any situation where total or final information is determined from a number of different, separate and perhaps widely separated information bits. For example, it may be desired to have continuous information of the total fuel on hand in a number of storage tanks without necessarily knowing the amount in each tank, while fuel may be continuously taken from and added to each tank. In some information manipulation problems it is desired to give more or less stress to information from one source than another. Particularly in computer applications it is often desirable to multiply or divide information as well as algebraically sum it with other information. A specific information combination problem is found in measuring the concentration of gases and vapors in the atmosphere of a confined area such as a submarine. In such applications millivolt range signals are generated from gas measuring devices located at various places about the ship to measure the concentrations of carbon dioxide and hydrogen, for example, at selected locations. Such signals are low level and require sensitive indicating apparatus and furthermore must be combined without any feedthrough or cross-modulation of one signal source to another. Existing devices for signal combination have proved undesirably bulky and undesirably inadequate for signal isolation.

It is accordingly an object of this invention to provide a summation of a plurality of electrical signals while maintaining complete isolation of each signal source one from the other.

A further object of this invention is to provide an algebraic summation of a plurality of electrical signals while maintaining complete isolation of each signal source one from the other.

It is still another object of this invention to provide a system for multiplication, division, addition and subtraction with electrolytic condensers.

Other objects and advantages of this invention will become apparent from the following description and accompanying drawings wherein similar reference numerals represent corresponding parts throughout the several views.

In the drawing:

FIG. 1 is a schematic diagram of an indicator according to this invention for providing an algebraic summation of five direct current signal sources.

FIGS. 2 and 3 are schematic diagrams of modifications of the embodiment of FIG. 1 by which the value of a signal from any signal source may be decreased or increased before combination with the other signal sources.

Briefly, this invention provides an algebraic summation of a plurality of signal sources while maintaining complete isolation of each signal source with respect to the others. This complete isolation is maintained by alternately switching a group of individual storage capacitors. The capacitors are first switched so that each is separately and independently connected across a different one of the signal sources, on the next switching cycle, the capacitors are all disconnected from their respective signal sources and switched into a series connection, the total voltage appearing across this series connection being of course the algebraic summation of the signals stored within each individual capacitor. It is a particularly significant feature of this invention, for the purposes of savings in space, weight and overall cost, that the storage capacitors in the preferred embodiment of this invention are of the electrolytic type. In order that the polarity of the electrolytic condensers may be properly observed, reversing switches are associated with them so that they can contribute negative voltage information to the series circuit when same is appropriate. As an additional feature extending computer application of this invention, means are provided to multiply or divide individual signals before combining them in summation with others.

Referring now to the drawings in detail, the schematic diagram depicted in FIG. 1 shows a group of five direct current signal sources designated respectively $E_1$ through $E_5$. A corresponding number of electrolytic storage capacitors are designated at 21 through 25. Each terminal of each storage capacitor is connected to a separate single pole, double throw switch designated at 11 through 15 and 16 through 20, respectively. It will be noted that in each of these connections of electrolytic capacitor to a single pole, double throw switch, the connection is made to the center or lever terminal of the switch. Each of the single pole, double throw switches are ganged together as indicated by a series of dashed lines 26 shown with means to operate in synchronism depicted by another dashed line 27 which may be operated by hand or by motor driven means 28. The effect of ganging switches 11 through 20 by levers 26 and 27 has in effect converted the group of switches to a ten pole, double throw switch. As shown in the drawing, when each of the switch sections 11 through 20 are moved to their lower position the five storage capacitors are connected independently to their respective signal inputs $E_1$ through $E_5$. When the switch sections 11 through 20 are moved to their upper position the five electrolytic capacitors 21 through 25 become connected in series. The polarity which each storage capacitor presents to the series combination is controlled by a group of five double pole, double throw reversing switches designated 31 through 35. Each reversing switch is shown connected to a respective one of capacitors 21 through 25 when its corresponding switches are in the upper position.

As shown in FIG. 1, each of reversing switches 31 trough 35 is manually set so that its corresponding condenser will introduce the polarity that is desired to the series circuit. For this type of operation each of the signal sources $E_1$ through $E_5$ should be connected so that they introduce a positive potential to the series of switches 11 through 15 and a negative potential to the series of switches 16 through 20, the polarity effect which each signal source should have on the combined output is selected by operating reversing switches 31 through 35 to the appropriate position. As shown in FIG. 1, reversing switches 31, 33 and 35 are set so that $E_1$, $E_3$ and $E_5$ are introduced to the summation as positive signals and switches 32 and 34 are set so that $E_2$ and $E_4$ are introduced as negative signals. In other words, $E_1$, $E_3$ and $E_5$ may be said to have positive coefficients and $E_2$ and $E_4$ negative coefficients.

Should signal sources $E_1$ through $E_5$ be of a character which might provide signals varying from a positive to a negative potential, or should it be desired to provide for automatic operation of reversing switches 31 through 35 instead of manual operation thereof, corresponding reversing switches may be inserted between the signal sources and their connection to the switches 11 through 15 and 16 through 20. Such reversing switches should be operated by polarity sensing devices such that the signal from the signal sources would always reach its respective capacitors with a polarity appropriate to the capacitor terminals. The automatic operation of such input reversing switches should also be used to gang the output reversing switches 31 through 35 so that any signal appearing as a negative signal and thus requiring the operation of the automatic reversing switch, would also operate the respective output reversing switches 31 through 35 to insure that negative signals would appear in the series combination with negative polarity.

The switch arms of switches 11 through 15 and 16 through 20, shown as controlled by levers 26, should be perfectly synchronized. For this purpose a set of rotating brushes passing over commutator segments may be used, however a preferred means is an alternating current operated direct current chopper in which the movable contact is on a reed vibrating at the frequency of the actuating alternating current, such as conventional 60 cycles. The output of the series connection of the capacitors as effected by the switch arms 26 is collected on a pair of leads 36 and delivered to the output represented in FIG. 1 as an indicating meter 38 or 39. An electrolytic capacitor 37 is connected across leads 36 to filter out the ripple appearing in the output because of switching action. The sum voltage delivered to capacitor 37 may be read on a conventional volt meter depicted at 38 in FIG. 1, or where it is desired to provide an indicator which will impose no load upon the signal sources and a more accurate voltage reading, the output of the signal summer may be connected to a self balancing potentiometer shown at 39 which may be operated to avoid loading the summation circuit.

FIG. 2 shows signal source $E_1$ connected to its corresponding electrolytic condenser 21 through a voltage divider comprising a pair of resistors 40 and 41. In accordance with standard voltage dividing equations, the signal from source $E_1$ may thus be applied to the signal summation with a coefficient less than 1.

The circuit of FIG. 3 shows source $E_1$ connected to a group of electrolytics designated 21A 21B and 21C. The group of three electrolytics shown is arranged so that all or a portion of the full value of signal $E_1$ is applied to each of the electrolytics 21A, 21B and 21C and these electrolytics are then switched in series synchronously with the switching in series of the entire signal summation circuit thus providing the application of signal source $E_1$ to the signal summation with a coefficient greater than 1. It will be seen that by using additional electrolytics similar to those assigned to each of the signal sources, each signal source may be multiplied by as many times as electrolytics are added, furthermore, by combining FIG. 2 into FIG. 3 such as illustrated with resistors 40 and 41 feeding electrolytic 21A, it is seen that the coefficient of the signal source may be multiplied by fractions as well as whole numbers. In the usual case, each of the electrolyitcs 21 through 25 and 21A, 21B and 21C are of the same capacitance and have the same ratings and characteristics.

It will be understood that while five signal sources were shown in FIG. 1, this invention would be equally applicable to any number of signal sources. It will be further noted that while the signal sources $E_1$ through $E_5$ in FIG. 1 are shown as direct current signal sources, this invention can be equally well adapted to operation with alternating current signal sources by the insertion of a unilateral impedance device between each signal source and its respective storage electrolytic capacitor so that the polarity requirements of the capacitor would not be violated. The signal summation circuit of this invention has thus provided a continuous indication of the algebraic sum of a number of independent and variable signals which may be represented by the expression $$E = X_1 E_1 + X_2 E_2 + \ldots X_N E_N \quad (1)$$

in which $E_1 \ldots E_N$ are independently generated variable signals and $X_1 \ldots X_N$ are positive or negative coefficients of each of said signals and having a value equal to greater or less than 1.

It has been found by experience that if meter 38 is connected to leads 36 it is desirable to have as high a resistance as possible in the moving coil. Also it is preferable that all capacitors used in the summation be similar and also preferably of high capacitance. The indicated sum depends on the number of capacitors used and a given meter must be calibrated for a given set of conditions.

It has been observed that these requirements can be expressed in a simple formula $$E = E_0 R / (R + \Sigma R_c) \quad (2)$$

in which $E_0$ is the summed open circuit potential, $E$ is the summed potential with an indicating meter of resistance $R$ and $\Sigma R_c$ is the total apparent resistance of the capacitors used in the summation.

The difficulties just mentioned can be completely eliminated, however, if the summation is indicated on self-balancing potentiometer 39. With such a potentiometer the open circuit potential of the summation is indicated, and the indicated sum is completely independent of the capacitance of the summing capacitors and of the number of capacitors used in the summation.

It will be understood that various changes in the details and materials which have been described herein to explain the nature of the invention may be made by those skilled in the art within the principle and scope of the invention as expressed in the appended claim.

What is claimed is:

An electrical summation circuit comprising, a plurality of pairs of electrical signal input terminals, an equal plurality of pairs of signal output terminals, said pairs of output terminals being connected in series, an equal plurality of signal multipliers having selectively the capability of multiplying a signal by a factor greater than one, less than one, and unity, and switching means for alternately connecting each of said signal multipliers to one of said pairs of input terminals and to one of said pairs of output terminals with a selected polarity to provide an algebraic summation of an individually selected proportion of each of a plurality of signals applied to said input terminals.

References Cited in the file of this patent

UNITED STATES PATENTS

| | | |
|---|---|---|
| 2,047,463 | Dubilier | July 14, 1936 |
| 2,349,437 | Keeler | May 23, 1944 |
| 2,647,236 | Saunderson | July 28, 1953 |
| 2,678,422 | Broomell | May 11, 1954 |
| 3,027,087 | Blocker et al. | Mar. 27, 1962 |